April 12, 1966 P. A. DLUGOSCH ETAL 3,245,479
HARROW ATTACHMENT FOR PLOW
Filed July 19, 1963 3 Sheets-Sheet 1
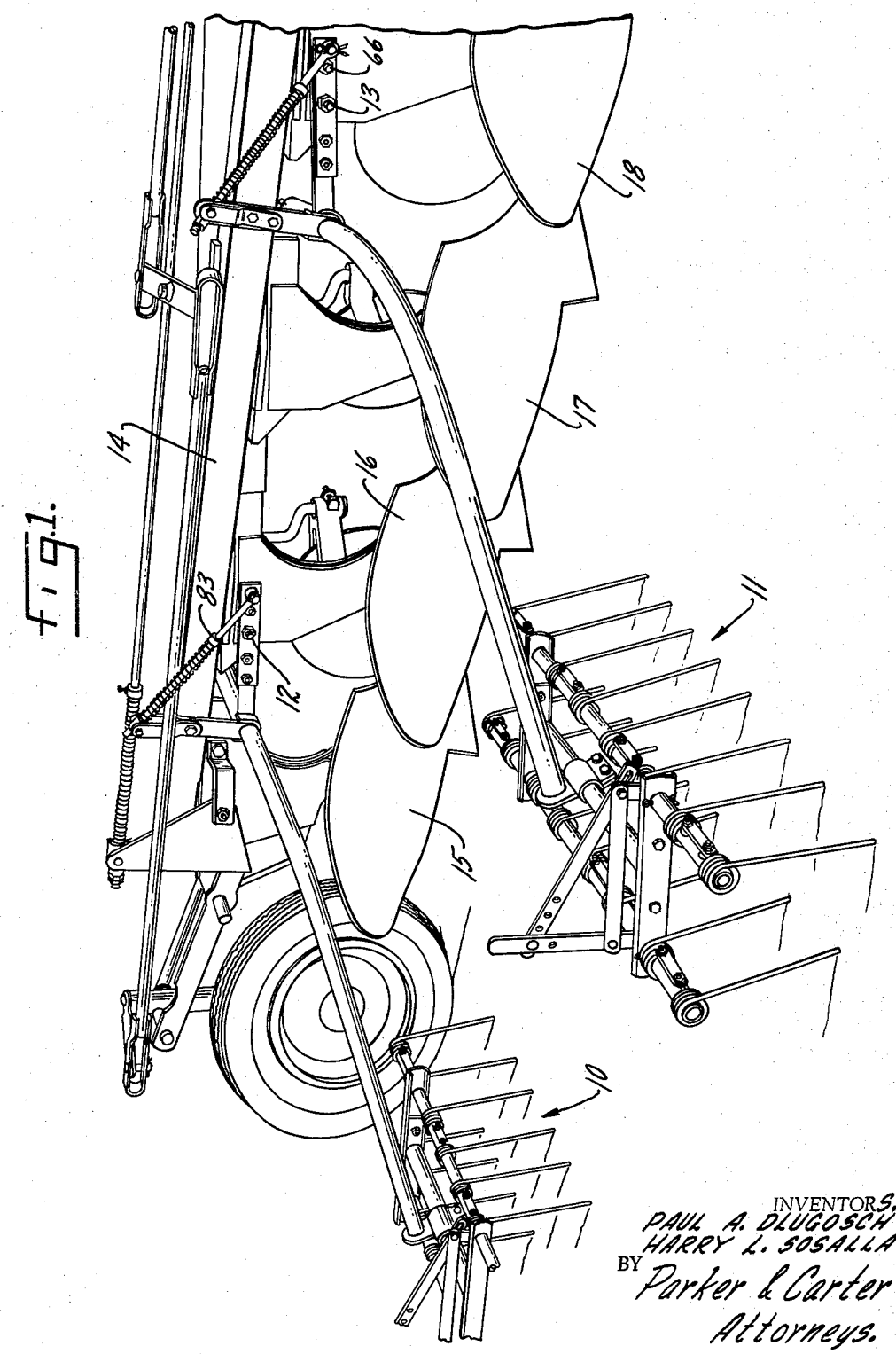
INVENTORS.
PAUL A. DLUGOSCH
HARRY L. SOSALLA
BY Parker & Carter
Attorneys.

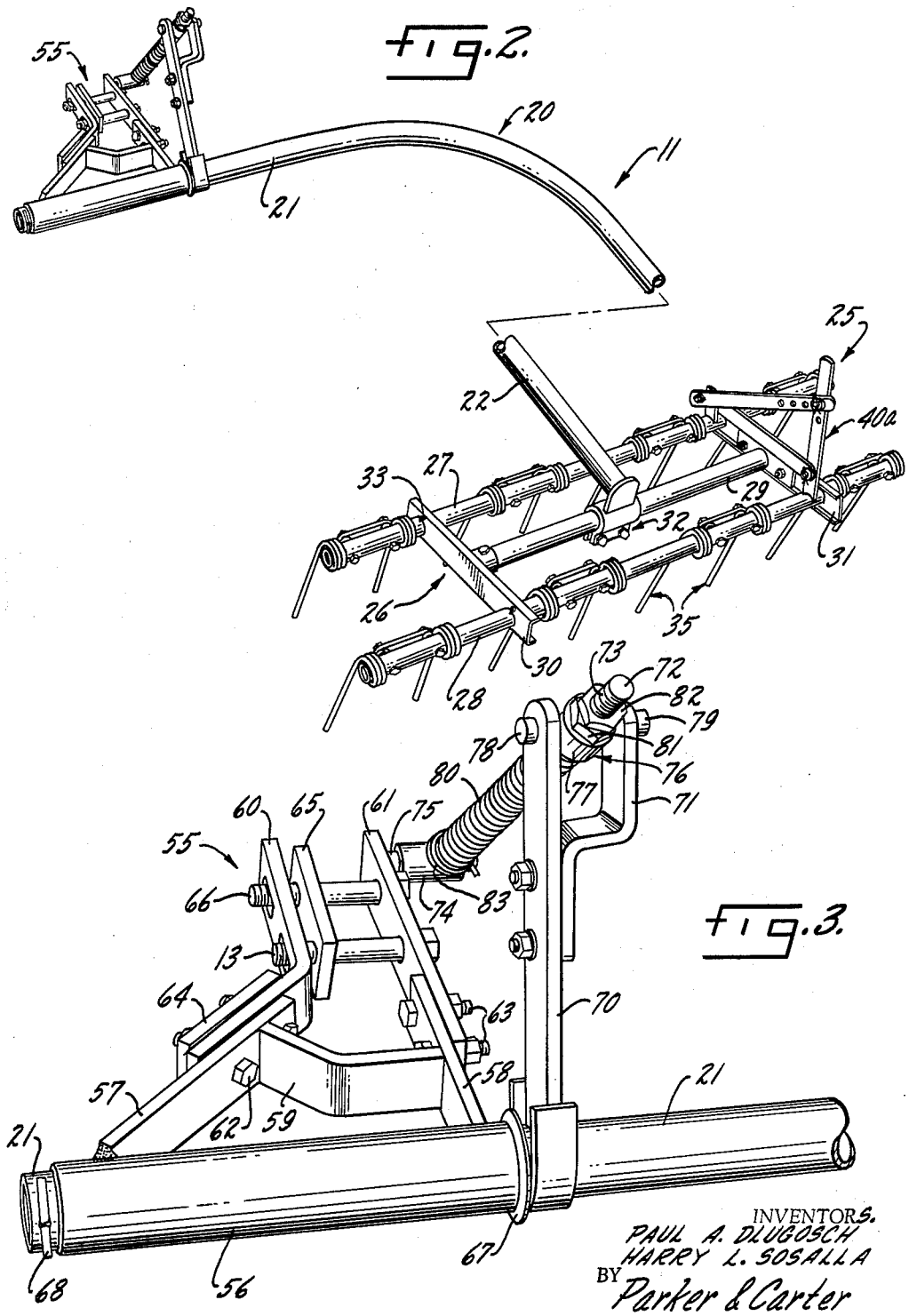

April 12, 1966     P. A. DLUGOSCH ETAL     3,245,479
HARROW ATTACHMENT FOR PLOW
Filed July 19, 1963     3 Sheets-Sheet 3
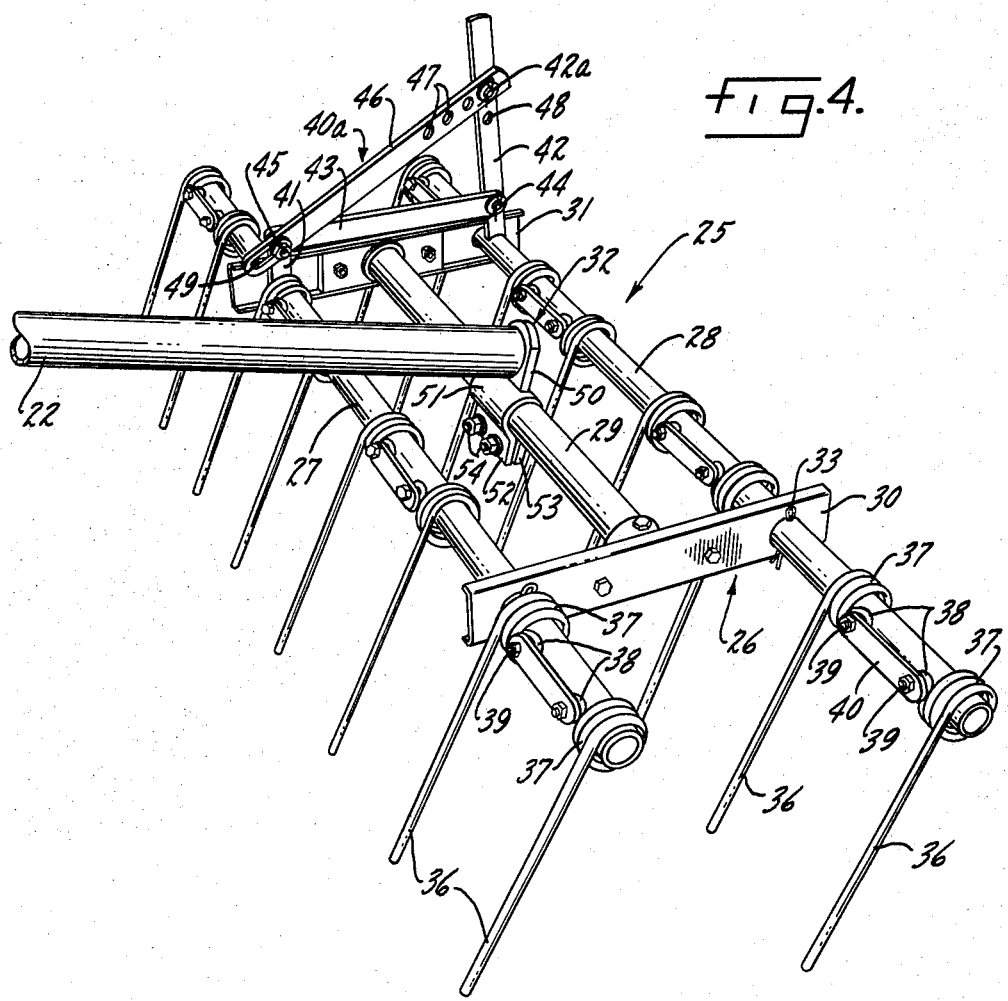
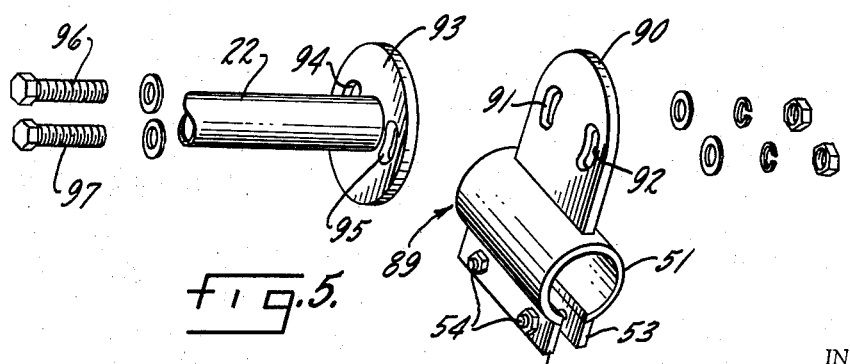
INVENTORS.
PAUL A. DLUGOSCH
HARRY L. SOSALLA
BY Parker & Carter
Attorneys.

ced Apr. 12, 1966

3,245,479
HARROW ATTACHMENT FOR PLOW
Paul A. Dlugosch and Harry L. Sosalla, Sac City, Iowa
Filed July 19, 1963, Ser. No. 296,281
1 Claim. (Cl. 172—635)

This invention relates to soil conditioning apparatus, and particularly to a unique harrow which has a multitude of adjustments to accommodate different field conditions and different sized plow frames.

Accordingly, a primary object of the invention is to provide a harrow which can be fabricated in nearly any desired width so as to accommodate, either singly or in combination, almost any number of plow bottoms.

A further object is to provide a harrow having means for adjusting the angle of the harrow teeth over a wide range to accommodate different soil conditions and desired tooth penetrations.

Yet another object is to provide a harrow having means for slacking off the angle of tooth penetration upon retrograde movement to thereby eliminate the tendency of the harrow teeth to dig into the ground when the harrow is backed up.

A further object is to provide a harrow in which the harrow tooth bars can be rotated to level the tooth bars for even ground penetration of the leading and trailing bars.

Yet another object is to provide a harrow which is attached to a plow frame by a spring loaded compression arm, the tension of which can be easily varied.

Yet another object is to provide a harrow in which the tooth bars can be rotated about an axis which is generally axially aligned with the direction of movement so as to accommodate variations of soil throw and leave a smoother surface, especially when two or more tractors having different plows are used in the same field.

A further object is to provide a harrow which is rugged, relatively inexpensive to manufacture, and can be easily adapted to a wide variety of plow frames.

Other objects and advantages of the invention will become apparent by a reading of the following description of the invention.

The invention is illustrated more or less diagrammatically in the accompanying figures wherein:

FIGURE 1 is a perspective view of a pair of harrow units attached to a plow frame;

FIGURE 2 is a perspective view from a different angle of a harrow unit;

FIGURE 3 is a perspective view of structure for attaching the harrow to a plow frame and the spring loaded compression arm;

FIGURE 4 is a perspective view of the harrow showing particularly the tooth bars and tooth angle adjustment linkage; and FIGURE 5 is an exploded view of an arrangement for raising or lowering the sides of the harrow by rotation about an axis generally axially aligned with the direction of movement.

Like reference numerals will be used to refer to like figures throughout the following description of the drawings.

A pair of harrow units are indicated generally at 10 and 11 in FIGURE 1. A forward end portion of the units is attached by any suitable means, such as bolts 12 and 13, to a conventional plow frame 14. A number of plow bottoms 15, 16, 17 and 18 are supported by any convenient structure from the plow frame 14. Usually the plow frame will extend rearwardly from a tractor but inasmuch as the vehicle used for powering the harrow does not form a part of the invention it is not further illustrated or described.

The harrow unit or attachment 11 is shown best in its entirety in FIGURE 2. The unit includes an angular main frame arm 20 which includes a forward or front end portion 21 and a trailing or outer end portion 22, the leading and trailing portions being disposed at approximately right angles to one another.

The harrow itself is indicated generally at 25. It includes a sub-frame 26 which carries a plurality of harrow tooth supporting members or tooth bars 27 and 28. The sub-frame consists essentially of a transversely disposed tubular member or center piece 29 to which a pair of rigid spacer members 30, 31 are suitably secured. In this instance the components of the sub-frame are bolted to one another but it should be understood that within the scope of the invention the components can be connected to one another by any suitable means. A clamp, indicated generally at 32, secures the sub-frame to the outer end portion 22 of the main frame arm.

Referring now to FIGURE 4, each of the two tooth bars is rotatable in suitable aligned apertures in spacers 30, 31. Cotter pins 33 or any other suitable means prevent unintended longitudinal movement of the tooth bars through the spacer apertures.

A plurality of harrow teeth are indicated at 35. Each tooth consists essentially of a short piece of rod or bar stock, the lower end portion of which extends straight downwardly as at 36 so as to penetrate the ground. The other end of each tooth is coiled approximately 3 times around its associated bar, as at 37, and its free end formed into a hook or loop indicated at 38. The teeth are arranged in pairs along each tooth bar with the terminal ends 38 of each pair adjacent one another as shown best in FIGURE 4. The terminal ends 38 are secured to the tooth bars by bolts 39 which pass through the tooth bar, the loop formed in the end of the coiled rod, and the clamp plate 40. One clamp plate extends between each of two adjacent terminal ends 38. The coils 37 are slightly larger than the outside diameter of tooth bars 27, 28. In an inoperative position the angle of each tooth 36 is fixed with respect to its tooth bar but, due to the oversized coil, and the spring effect provided by the coil, each tooth can be depressed rearwardly slightly when in engagement with the ground in order to "give" when immovable objects such as boulders strike the teeth.

Means for varying the angularity of the teeth with respect to the sub-frame is indicated generally at 40a in FIGURE 4.

The angularity adjustment means consists essentially of a pair of generally vertically upwardly extending arms or link anchors 41 and 42, each of which is welded to its associated tooth bar. The connector bar 43 is pivotally connected to the lower end portion of arm 42 by pin 44, and to the upper end portion of arm 41 by pin 45. An adjusting link is indicated at 46. A plurality of holes 47 are formed near the trailing end portion of the adjusting link, and the link is connected to one of a plurality of holes 48 in the arm 42 by pin 42a. The lower or forward end of adjusting link 46 has a slot 49 formed therein. Pin 45 passes through the slot 49 as well as apertures in arm 41 and connector bar 43 to thereby form a triangular linkage system.

Clamp 32 consists essentially of a flange 50 which is welded to the terminal end of trailing portion 22 of the main frame arm. The bottom of the flange is welded to a short sleeve or collar 51 which is peripherally discontinuous. A pair of substantially co-extensive flanges 52, 53 project downwardly from the collar. The flanges are pinched together by bolts 54 which provide a tight frictional gripping force between the collar 51 and tubular member 29 of the sub-frame.

Referring now to FIGURES 2 and 3 a mounting assembly is indicated generally at 55. The assembly consists essentially of a sleeve 56 to which a pair of plates 57, 58 are welded, the plates in turn being reinforced by bent plate 59. A pair of mounting brackets are indicated at 60 and 61. The mounting brackets are secured to plates 57, 58 respectively by any suitable removable connecting means, such as fasteners 62, 63. Spacers are indicated at 64 and 65. The outer ends of the mounting brackets 60, 61 and spacer 65 are apertured to receive a pair of connecting bolts 66 and 13. As best seen in FIGURE 1, the bolts 66 and 13 are used to secure the harrow unit to the plow frame 14. The upper end portion 21 of the main frame arm extends through sleeve 56. The flange 67 and a cotter pin 68 maintain the sleeve 56 longitudinally fixed along the upper end portion 21 of the main frame arm.

A lever, or compression arm, 70 is welded to and extends upwardly from the upper end portion 21 of the main frame arm. An offset bracket 71 is secured to the upper end of the lever 70. A spring rod is indicated at 72. The spring rod is essentially a straight shaft, at least the outer end portion of which is threaded as at 73. The lower end of the spring rod is secured by any suitable means to a sleeve 74 which is carried by a stub shaft 75 which in turn is secured to the outer end of mounting bracket 61. Any suitable means may be employed to prevent the sleeve or collar 74 from sliding off the end of stub shaft 75. The upper end of spring rod 72 is connected to compression arm 70 by the adjustable collar indicated generally at 76. The collar consists essentially of a ring 77 whose internal diameter is larger than the diameter of rod 72 so that it may be reciprocated along the rod. A pair of shafts 78, 79 project outwardly from slip ring 77 and are journaled in apertures formed in the upper ends of compression arm 70 and bracket 71. A coiled spring is indicated at 80. The upper end of the spring bears against one face of slip ring 77, and the spring is biased to push ring 77 outwardly along the free end of rod 72. A pair of lock nuts 81, 82 limit the outward excursion of slip ring 77.

The tension of spring 80 may be adjusted by moving the adjustable collar 83 along the lower end portion of rod 72, which lower end portion may also be threaded. The lower end of the spring bottoms on the adjustable collar, and the collar is secured to the rod by any suitable means.

An alternate clamp assembly is illustrated in FIGURE 5. In this figure a pair of arcuate notches 91, 92 are formed in flange 90. A complementary plate 93 has a similar pair of notches 94, 95 formed therein. The lower end portion 22 of the main frame arm is welded to the rear side of plate 93 as viewed in the figure. Suitable fasteners, in this instance carriage bolts 96, 97 pass through the pairs of aligned notches 91, 94 and 92, 95 to thereby secure the outer portion 22 of the main frame arm to the flange 90 of clamp member 89.

The use and operation of the invention is as follows:

The harrow unit is attached to a plow frame, such as plow frame 14 in FIGURE 1, or any other suitable supporting structure by the mounting brackets 60, 61 and fasteners 66, 13. The mounting brackets and spacers 64, 65 may be formed in many shapes to provide flexibility in mounting to the various plow frames now on the market. The illustrated construction is exemplary only and it should be understood that it is well within the scope of the art to arrange the brackets and spacers in such a way as to be easily securable to either a plow frame or the plow bottom supporting structure.

In any event once the harrow unit is attached to its appropriate supporting structure mounting assembly 55 is fixed with respect to the supporting structure.

The main frame arm 20 however is movable with respect to the assembly 55 and the plow frame. That is, since the upper portion 21 of the main frame arm is rotatable in sleeve 56 within the limits of rotation imposed by the spring 80 and adjusting nuts 81, 82, the harrow 25 is resiliently or yieldably mounted with respect to the supporting structure. Since the length of outer end portion 22 of the main frame arm is considerably longer than the compression arm 70 a relatively small arcuate movement of the compression arm about the fixed pivot axis of sleeve 56 will provide a considerably larger arc of swing of the harrow unit about the sleeve axis.

As the harrow unit moves forward, the individual teeth 35 dig into the soil in a manner well-known in the art. There is some give or play in the individual teeth due firstly to the yieldable mounting of the harrow unit itself due to the spring loaded compression arm arrangement 70, and additionally from the oversized coiled portion 37 of each individual tooth.

The angle of the teeth with respect to the ground is adjusted by the mechanical linkage assembly indicated generally at 40a. With the illustrated construction any one of 8 different tooth angle settings can be provided by securing adjusting link 46 to vertical arm 42 in any one of the 8 possible hole combinations. That is, any one of the four holes in adjusting link 46 may be aligned with either of the two holes in bracket 42.

The lost motion slot 49 in link 46 eliminates the tendency of the teeth to dig into the ground when the unit is backed up. That is, assuming a reversing force is applied to the harrow 25 through main frame arm 20, link 46 slides rearwardly until the left end of the slot is brought up against connecting pin 45. This lost motion movement results in a tilting of the upper ends of the teeth in a clockwise direction from whatever angle of setting they had previously been disposed at. As soon as the unit moves forward, the teeth return to their original position.

If it is desired to rotate the entire sub-frame assembly in order to insure even penetration of the teeth carried by the front and rear tooth bars, bolts 54 on the clamp assembly are loosened and sub-frame center piece 29 rotated until the lower end of the teeth rest flat against a horizontal surface. Bolts 54 are then merely re-tightened.

Further, should it be desired to slide the entire harrow sideways, or transversely, with respect to the trailing end portion 22 of the main frame arm, the bolts 54 are loosened and the entire sub-frame including the tooth bars and teeth are moved sideways.

When plowing with two or more tractors in the same field, and assuming that the tractors have different plows, it is occasionally necessary to rotate the harrow about the axis of the trailing portion 22 of the main frame arm in order to accommodate the variation of soil throw from the plow bottoms and to leave a smoother surface. In this event the adjustment means of FIGURE 5 may be employed. In order to tilt the harrow about an axis generally aligned with the direction of movement the fasteners 96, 97 are loosened and flange 90, and thereby the harrow, is rotated with respect to plate 93. As soon as the proper angle is established the fasteners are passed through overlapping portions of the aligned apertures 91, 94 and 92, 95, and the unit is ready for plowing.

Although a preferred embodiment of the invention has been illustrated and described it will at once be apparent to those skilled in the art that various modifications may be made without departing from the essential spirit and scope of the invention. Accordingly it is intended that the scope of the invention be limited only by the scope of the claim when interpreted in light of the pertinent prior art rather than the foregoing exemplary description.

We claim:

A coil tooth type harrow attachment which is movable in a retrograde direction upon reverse movement of the frame to which the harrow attachment is mounted, said harrow attachment including a carrying arm assembly having a trailing outer end portion and mounting structure for connecting the carrying arm assembly to the frame, a sub-frame on the outer end portion of the carrying arm assembly, said sub-frame including a center member and end members rigidly secured to the center member, a plurality of harrow tooth supporting members rotatably mounted on the end members, and harrow teeth on said harrow tooth supporting members, said harrow tooth supporting members extending generally transversely of the direction of plowing movement to thereby present the harrow teeth directly to the soil, means for maintaining a downward thrust on the harrow teeth, said harrow teeth being formed of wire and including coil and tine portions, the coil portion of each tooth encircling its associated harrow tooth supporting member and having a greater internal diameter than the major cross-sectional dimension of said associated harrow tooth supporting member at the point of suspension therefrom to thereby provide yieldable angular displacement of the tine portions when the teeth move in both a forward and rearward direction, retrograde movement means for providing reverse rotational displacement of the harrow teeth upon retrograde movement of the tooth supporting members, said retrograde movement means including a linkage assembly interconnecting the harrow tooth supporting members to one another, and having a lost motion connection, said linkage assembly acting conjointly with the yieldability of the teeth to provide maximum yieldability of the teeth when the harrow attachment is moved in a retrograde direction.

References Cited by the Examiner

UNITED STATES PATENTS

| | | | |
|---|---|---|---|
| 181,173 | 8/1876 | Hughes | 172—707 |
| 264,300 | 9/1882 | Stanton | 172—707 |
| 1,122,837 | 12/1914 | Young | 172—500 |
| 1,412,124 | 4/1922 | Long | 172—618 |
| 1,580,145 | 4/1926 | Leyner | 172—677 |
| 1,596,838 | 8/1926 | Houser | 172—202 X |
| 2,758,531 | 8/1956 | Siems | 172—142 |
| 2,934,155 | 4/1960 | McMaster | 172—654 X |
| 2,994,388 | 8/1961 | Ryan | 172—635 |
| 3,049,184 | 8/1962 | Lohrman | 172—707 |
| 3,085,634 | 3/1963 | Hotchkiss | 172—497 |
| 3,100,018 | 8/1963 | Sokolowski | 172—160 |

OTHER REFERENCES

"John Deere Operator's Manual," OM–B55–759, 494 and 495, Corn Planters, page 52, Oct. 1, 1959.

ABRAHAM G. STONE, *Primary Examiner.*

T. GRAHAM CRAVER, ANTONIO F. GUIDA,
*Examiners.*